United States Patent [19]

Barley

[11] 4,313,637
[45] Feb. 2, 1982

[54] SEAT HAVING A MOVABLE LUMBAR SUPPORT

[75] Inventor: Geoffrey W. Barley, Kislingbury, England

[73] Assignee: UOP Inc., Des Plaines, Ill.

[21] Appl. No.: 93,567

[22] Filed: Nov. 13, 1979

[30] Foreign Application Priority Data

Nov. 18, 1978 [GB] United Kingdom ............... 45172/78

[51] Int. Cl.³ .............................................. A47C 7/46
[52] U.S. Cl. .................................................. 297/284
[58] Field of Search ........................................ 297/284

[56] References Cited

U.S. PATENT DOCUMENTS

| | | |
|---|---|---|
| 1,835,048 | 12/1931 | Hottel . |
| 1,968,232 | 7/1934 | Thomas . |
| 2,139,028 | 12/1938 | Mensendicck et al. ............. 297/284 |
| 2,550,831 | 5/1951 | Lingenfelter . |
| 2,756,809 | 7/1956 | Endresen ............................. 297/284 |
| 2,991,124 | 7/1961 | Schwarz .............................. 297/284 |
| 3,642,319 | 2/1972 | Berchicci ............................ 297/284 |
| 3,880,463 | 4/1975 | Shephard et al. ................... 297/284 |
| 3,890,000 | 6/1975 | Easley ................................. 297/284 |
| 4,143,293 | 5/1979 | Sheldon .............................. 297/284 |
| 4,148,522 | 4/1979 | Sakurada et al. ................... 297/284 |
| 4,156,544 | 5/1979 | Swenson et al. .................... 297/284 |

FOREIGN PATENT DOCUMENTS

| | | |
|---|---|---|
| 1530970 | 3/1972 | Fed. Rep. of Germany . |
| 2541559 | 3/1977 | Fed. Rep. of Germany . |
| 1527147 | 4/1967 | France . |
| 849798 | 9/1960 | United Kingdom . |
| 1011726 | 12/1965 | United Kingdom . |

Primary Examiner—Francis K. Zugel
Attorney, Agent, or Firm—James R. Hoatson, Jr.; Barry L. Clark; William H. Page, II

[57] ABSTRACT

The invention relates to a seat having a movable lumbar support. An arcuate lumbar support is mounted on a back rest frame of the seat by a mechanism which is operable to move the lumbar support forwards or backwards or to tilt the lumbar support as its axis moves vertical to effect a rolling action thereby to raise or lower the level at which it supports a seat occupant. A screwthread in the mechanism is spring-supported to reduce shock applied by the lumbar support.

4 Claims, 8 Drawing Figures

SEAT HAVING A MOVABLE LUMBAR SUPPORT

BACKGROUND OF THE INVENTION

This invention relates to seats, in particular vehicle seats, having a backrest which includes a movable lumbar support.

It is known for example from United Kingdom Patent Specification No. 1,011,726 to provide a seat having a back rest which includes a back rest frame and a lumbar support member mounted on said frame by means of a support mechanism, said lumbar support member having a support surface which is arcuate about a horizontal axis transverse to the back rest, the support mechanism being operable in one mode to displace the lumbar support in a forward or rearward direction and in a second mode to raise or lower the level at which the lumbar support member engages the back of a seat occupant.

The mechanism of the above-mentioned patent is operable by a knob disposed to the rear of the back rest and involves a simple forward and backward or vertical displacement of a spring on which a lumbar support member is mounted. In this mechanism, the lumbar support member is slidable on the inner face of the backrest upholstery, and the supporting spring is slidable in a vertical guide in the back rest frame.

A requirement exists for an improved support mechanism for a lumbar support member and preferably one which is readily operable by a person while sitting on the seat, and which mechanism consequently must be easily accessible and have low frictional resistance in its operation.

SUMMARY OF THE INVENTION

The present invention provides a seat having a back rest which comprises a back rest frame, a lumbar support member, and a support mechanism mounting said lumbar support member on said frame, said lumbar support member having a support surface which is arcuate about a horizontal axis transverse to the back rest, the support mechanism being operable in one mode to displace the lumbar support in a forward or rearward direction and in a second mode to effect a rolling or tilting action of the lumbar support member about a horizontal axis and simultaneously to move said axis vertically, to raise or lower the level at which the lumbar support member engages the back of a seat occupant.

BRIEF DESCRIPTION OF THE DRAWINGS

The invention will now be particularly described with reference to the accompanying drawings in which.

DESCRIPTION OF THE PREFERRED EMBODIMENTS

Figure 2:
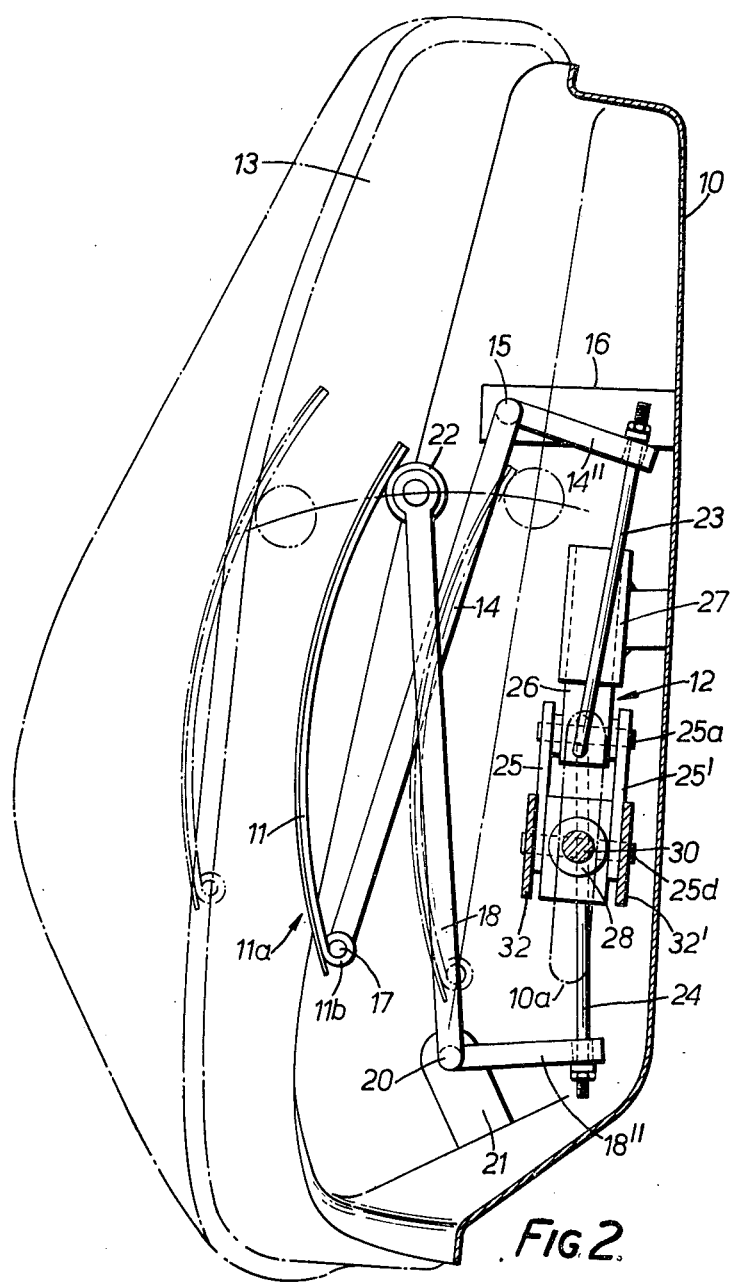
FIG. 2 is a section on the line II—II of FIG. 1.
Figure 3:
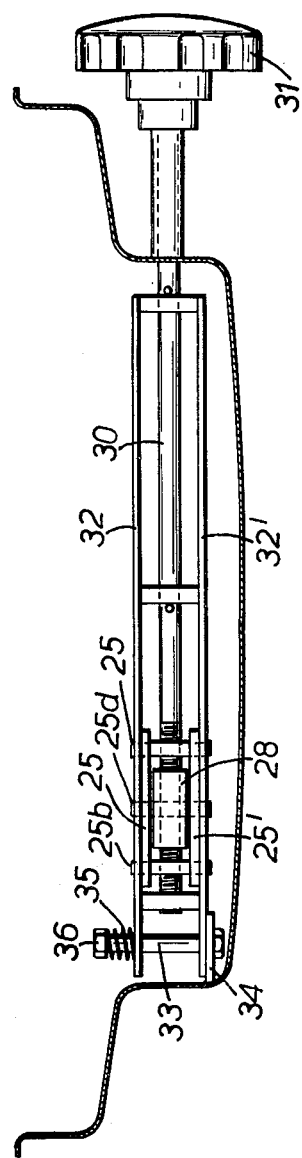
FIG. 3 is a section on the line III—III of FIG. 1.

The back rest illustrated in the drawings, and designed to form part of a vehicle seat, comprises a back rest frame 10, which can take the form of a dished sheet metal pan as shown in FIGS. 2 and 3 and a lumbar support member 11 mounted on the frame by means of a support mechanism 12. The lumbar support member 11 has a forward facing surface 11a which is arcuate about a horizontal axis transverse to the back rest, and is covered by the upholstery, in particular a moulded polyurethane foam cushion 13 with an integral or separate outer skin, which is secured to the periphery of the back rest frame 10.

The support mechanism 12 is designed to permit the occupant of the seat to move the lumbar support member 11 in a forward or backward direction and alternatively, or simultaneously, in an upward or downward rolling sense.

Figure 4A:
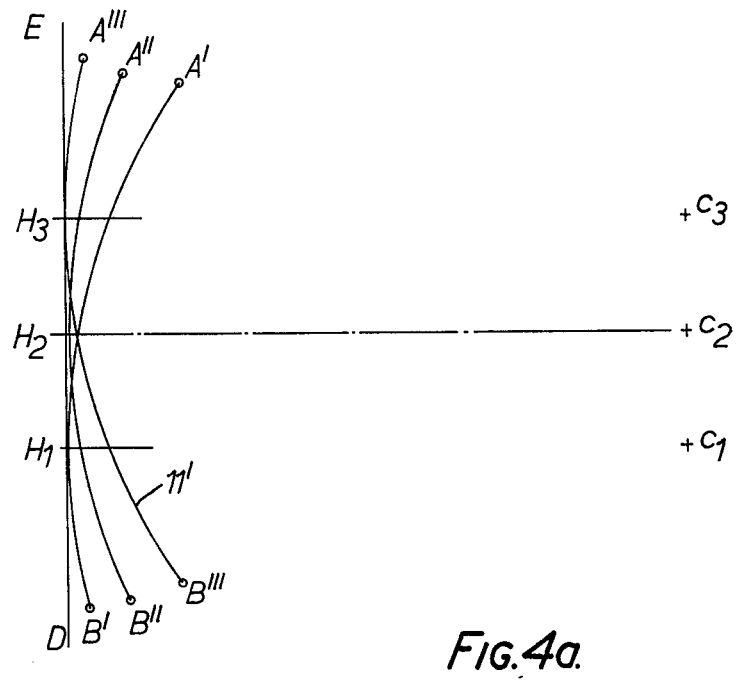
FIG. 4a, by way of comparison, illustrates the ideal movement of an arcuate lumbar support.

The ideal movement for the arcuate surface of the lumbar support member 11 is the movement illustrated in FIG. 4a in which the arc 11' rolls in contact with the tangential plane DE from position A'B' via position A"B" to position A'''B''' corresponding to vertical movement of the centre of curvature from C, via $C_2$ to $C_3$. The arc 11' makes contact with plane DE in these three positions at points $H_1$, $H_2$, and $H_3$, which represent the points at which an arcuate lumbar support rolling in this manner would contact the back of a seat occupant. If no sliding of the arc relative to plane DE occurs, the locus of B' and of A' is a cycloid.

Figure 4B:
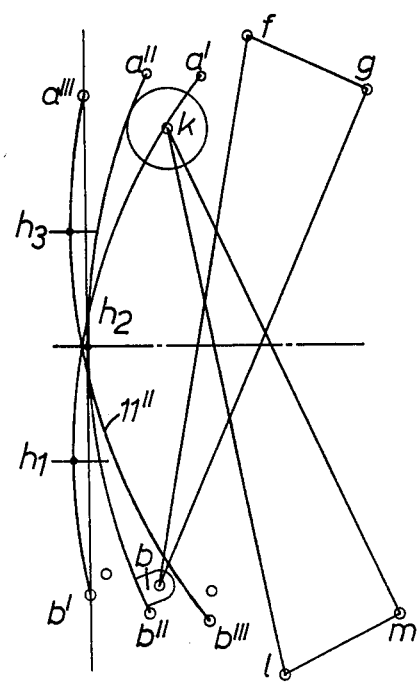
FIG. 4 is a diagrammatic representation of the movement of the lumbar support member shown in FIG. 2.
Figure 5:
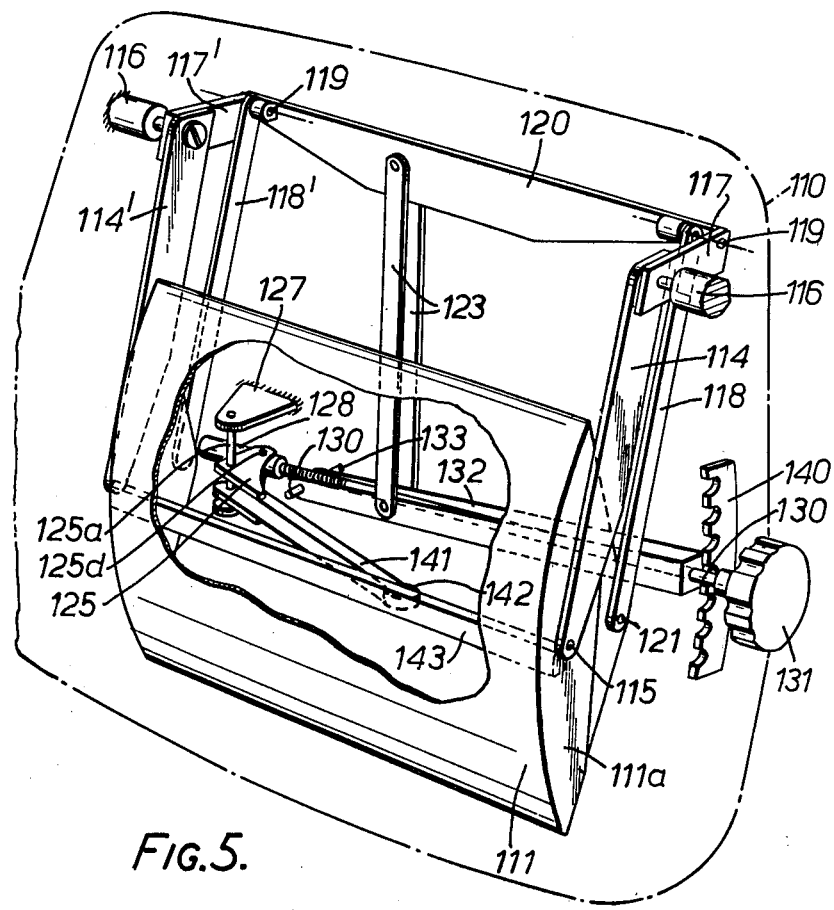
FIG. 5 is a perspective view of a modified embodiment of the back rest.

Such a rolling movement is difficult to reproduce mechanically but can be closely approximated to by the pivotal movement of an arcuate surface 11" seen in FIG. 4, which is suspended at point b from a first triangular array of linkages bf, fg, gb which have a fixed support at f, and a second triangular array of linkages km, ml, lk having a fixed support at 1, and mounting a roller B with its axis at k and arranged to roll in contact with the surface 11".

By appropriate movement of the point g and of point m, surface 11" can be made to move from position a'b' via a"b" to a'''b''' which correspond to movements of the centre of curvature of surface 11". In each of these positions the vertical tangent to the surface 11" is at $h_1$, $h_2$, $h_3$ respectively which correspond to ideal positions $H_1$, $H_2$, $H_3$ with only slight horizontal displacement of points $h_1$ and $h_3$ from the vertical line through $h_2$.

Figure 1:
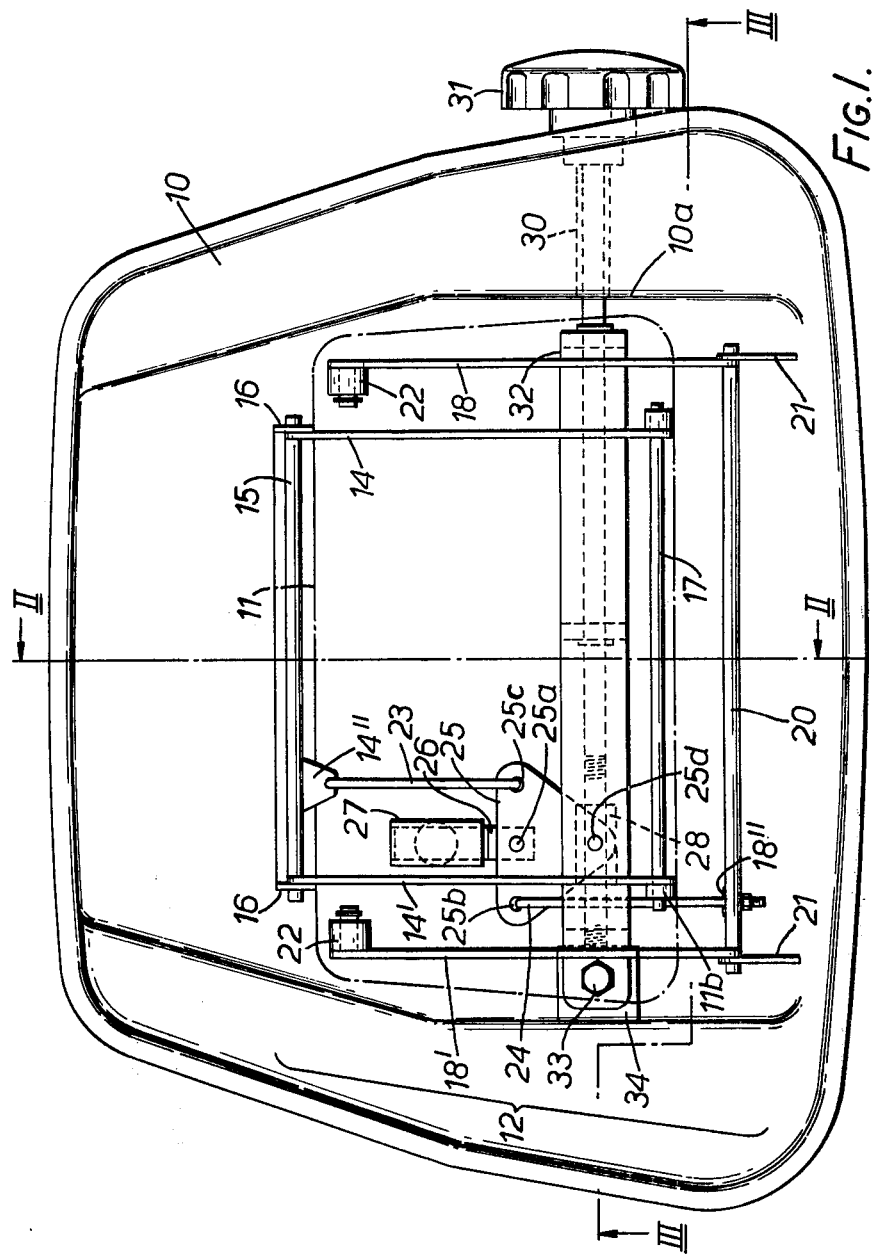
FIG. 1 is a vertical section in a transverse plane through a back rest of a vehicle seat in accordance with the invention.

This movement can be effected by the mechanism, seen in FIGS. 1 and 2, which comprise a first bell crank lever formed by parallel-spaced lever arms 14, 14' secured rigidly to an upper interconnecting rod 15 which is journalled at its ends in lugs 16 secured to the back rest frame 10. The lever arms 14, 14' are interconnected at their lower ends by a lower interconnecting rod 17 journalled at its opposite ends in bearings 11b on the rear surface of the lumbar support member 11. A radial arm 14" also forming part of the first lever extends rearwardly from the rod 15 for a purpose to be described below.

A second lever is formed by parallel-spaced lever arms 18, 18' which are rigidly interconnected at their lower ends by a rod 20 the ends of which are pivotally supported in lugs 21 secured to the back rest frame 10. The upper ends of the lever arms 18, 18' support rollers 22 arranged to roll on the arcuate rearward surface of the lumbar support member 11. A radial arm 18" extends from the rod 20 in a similar manner to the radial arm 14".

The radial arms 14" and 18" are connected at their free ends to first and second links 23, 24 for movement by the actuating mechanism for the lumbar support member.

This actuating mechanism comprises a pair of parallel-spaced triangular plate members 25, 25' which are secured together in spaced relationship and have a pivot rod 25a interconnecting members 25, 25' and located in a central position thereon. The rod 25a passes through a slider 26 which projects into the space between members 25, 25' and which is movable in a vertical guide 27 secured rigidly to the back rest frame. The members 25, 25' are also interconnected by pivot rods 25b, 25c engaged by the free ends of the links 23, 24, the rods 25b, 25c being spaced laterally of, and on opposite sides of, the pivot rod 25a.

A control member 28, by means of which the plate members 25, 25' can be rotated about the axis of pivot rod 25a or raised and lowered within the guide 27, is located between the plates and pivotally connected thereto by a pivot connection including lugs 25d extending laterally from the plate members 25, 25' into the control member 28.

Control member 28 is formed as a sleeve which is internally screwthreaded to mest with the external screwthread of an actuating rod 30 which extends in a generally horizontal direction through a vertical slot 10a in the back rest frame and carries a manually operable knob 31 at its outer end.

The actuating rod 30 is journalled for rotation about its longitudinal axis within a carrying frame which is formed by a pair of paralled-spaced elongate plates 32, 32' and pivoted at its end remote from the knob on a pivot shaft 33 engaging in a lug 34 rigid with the back rest frame. The plates 32, 32' extend on opposite sides of plate members 25, 25' and are pivoted thereto on the lugs 25d.

It will thus be seen that in operation, rotation of the knob 31 will cause the control member 28 to move longitudinally of the actuating rod 30. Since the rod 30 is secured against longitudinal movement by the carrying frame 32, 32', the transverse movement of the control member will rotate the triangular plates 25, 25' about the pivot rod 25a and cause longitudinal movement in opposite vertical directions of the links 23, 24. This in turn will rotate the levers 14, 14' and 18, 18' in opposite directions about the axes of their respective connecting rods 15, 20 resulting in horizontal forward or rearward displacement of the lumbar support member 11.

Independently of, or simultaneously with, this movement of the actuating rod 30, the rod can be hinged upwardly or downwardly by movement of the knob 31 to raise or lower the triangular plate members 25, 25'. This movement is permitted by vertical movement of slider 26 in guide 27. The vertical movement of the plate members 25, 25' will result in vertical movement of the links 23, 24 in the same direction and this in turn will produce rotation of the lever connecting rods 15 and 20 in a common sense. Accordingly one of the pairs of lever arms will swing towards the back rest frame and the other will swing away from the back rest frame causing tilting of the lumbar support member in one or other direction. This will raise or lower the point at which the supporting surface 11a of the lumbar support member 11 contacts a vertical plane, thereby raising or lowering the point at which the lumbar support member 11 will support the back of a seat occupant.

The frame 32, 32' is biassed by a spring 35, mounted on shaft 33 between a nut 36 and the frame, in a sense to urge the actuating rod 30 into frictional engagement with the rearward edge of the slot 10a. If this frictional engagement is not sufficient to secure the actuating rod in any selected position in which it is located, the edge of the slot can be notched or recessed at intervals.

Figure 6:
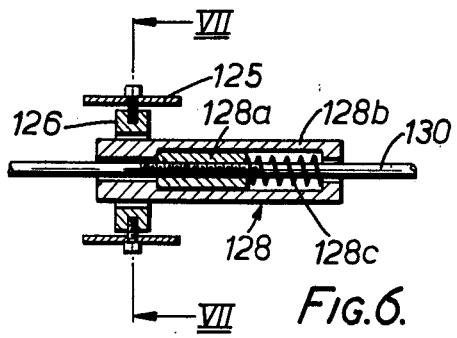
FIG. 6 is a section through a detail of the mechanism shown in FIG. 5.
Figure 7:
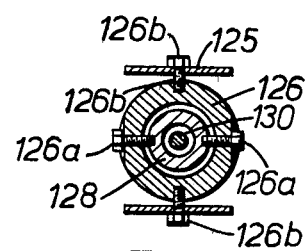
FIG. 7 is a section on the line VII—VII of FIG. 6.

Since the effect of the seat occupant leaning suddenly against the back rest can impart a substantial shock to the actuating mechanism, the control member is conveniently connected to the remainder of the actuating mechanism through a shock absorbing spring which conveniently can be incorporated in the manner described below in relation to FIG. 6.

According to a second embodiment of the invention, a lumbar support member 111 is carried on a first pair of lever arms 114, 114', the support member having side flanges 111a pivoted to the lower ends of the lever arms by pivotal connections 115. The lever arms 114, 114' have second pivotal connections at 116 to the back rest frame 110. A pair of links 117, 117', also pivoted at 116, extend rearwardly and are connected by pivotal connections 119 to the upper ends of a second pair of lever arms 118, 118'. Pivotal connections 119 are interconnected by a transverse plate 120 which, together with lever arms 118, 118', form an intermediate frame. The lower ends of the second lever arms 118, 118' are connected to the side flanges 111a by pivotal connections 121 spaced horizontally from the pivotal connections 115. The two lever arms 114, 118, 114', 118' at each side of the mechanism, interconnected by flanges 111a at their lower ends and by links 117, 117' at their upper ends, form together two parallel-spaced parallelogram linkages at opposite sides of the lumbar support member 111. Thus movement of lever arms 118,118', longitudinally with respect to lever arms 114, 114', will cause tilting movement of the lumbar support member 111 whereas pivotal movement of lever arms 114, 114' with respect to the back support frame 110, about the pivotal connections 116, will result in forward or rearward movement of the lumbar support member 111.

The mechanism for effecting relative movement as described above comprises a control member 128 screwthread on an actuating rod 130, having actuating knob 131 at its outer end. The rod is journalled within a carrying frame 132 which is supported pivotally by horizontal shaft 133 on the back rest frame 110 and connected pivotally by link arms 123 to plate 120 of the intermediate frame. Thus vertical pivotal movement of the actuating rod 130 results in corresponding vertical movement of the intermediate frame thereby producing relative longitudinal movement of the lever arms to cause the lumbar support member to tilt forwardly or backwardly. As in the first embodiment, a vertically spaced row of recesses, formed in this case on a plate 140 secured to the frame 110, is engageable with the actuating rod to hold the rod in any selected one of a corresponding number of vertically spaced positions.

The control member 128 is pivotally supported within a gimbal ring 126 having horizontal pivot pins 126a connected to member 128 and transverse pins 126b engaging parallel-spaced plates 125. Plates 125 in turn are pivoted about a vertical pivot shaft 125a supported in lugs 127 secured to the back frame. The plates 125 also rigidly support an arm 141 extending radially from the pivot shaft 125a and having a roller or slider 142 at its free end which engages in a guide 143 on the rear surface on the lumbar support member.

In operation therefore, rotation of the knob to cause the control member 128 to move longitudinally of the rod 130 causes pivotal movement of the spaced plates 125 about the supporting pivot shaft 125a and since this shaft is fixed to the back rest frame, the radial arm 141 is caused to swing in a horizontal plane and urge the lumbar support member 111 forwardly or rearwardly in a horizontal direction. This movement can be independent of, or simultaneous with, the tilting movement of the member 111 described above.

In order to absorb shock applied from the lumbar support member 111 to the screwthread actuator rod 130, the control member 128 comprises an internally screwthreaded nut 128a which is keyed for longitudinal sliding movement within an outer sleeve 128b. The sleeve is pivotally mounted between the parallel spaced plates 125 and contains a pre-compressed spring 128c which at one end engages against the end of the nut and at its opposite end engages against an internal flange of the sleeve. Thus movement of the nut relative to the sleeve in a direction caused by an impact on the forward face of the lumbar support member will be cushioned by the pre-compressed spring 128c.

I claim:

1. A seat having a back rest which comprises a back rest frame, a lumbar support member, and a support mechanism mounting said lumbar support member on said frame, said lumbar support member having a support surface which is arcuate about a horizontal axis transverse to the back rest, the support mechanism being operable in one mode to displace the lumbar support in a forward or rearward direction and in a second mode comprising two upwardly-extending horizontally-spaced pairs of support arms, means defining first pivotal connections at one end of said arms to the back rest frame and means defining second pivotal connections at the opposite end of said arms to the lumbar support member, the support arms of each pair being relatively movable to displace the second pivotal connections to effect a rolling or tilting action of the lumbar support member about a horizontal axis, and wherein said mechanism comprises means interconnecting one support arm of each pair to form a first lever, the first pivotal connections of said arms being located on said first lever at a level adjacent to or above the top of the lumbar support member and the second pivotal connections of said arms being located on said first lever at a level adjacent the bottom of the lumbar support member, and means interconnecting the other support arm of each pair to form a second lever, the first pivotal connections of said other arms being located on said second lever at a level adjacent to or below the bottom of the lumbar support member and the second pivotal connections of said other arms being located on said second lever at a position adjacent the top of the lumbar support member, one of said connections being a sliding or rolling connection, said mechanism including means for rotating said levers in opposite senses about the axes of their first pivotal connections in order to move the member forwardly and rearwardly and for rotating said levers in common senses about said axes in order to effect said rolling or tilting action on the member, and simultaneously to move said axis vertically, to raise or lower the level at which the lumbar support member supports the back of a seat occupant.

2. A seat according to claim 1 wherein said rotating means comprise a coupling member, a carrier, means pivoting said coupling member at a first pivot point to said carrier, means mounting the carrier for upward and downward movement on said frame, a control member, means pivoting the coupling member at a second pivot point vertically spaced from the first pivot point to said control member, an actuator operable to move the control member in an upward and downward direction and in a transverse direction, a pair of links, means pivoting the coupling member to said links at third and fourth pivot points disposed laterally of and on opposite sides of the first pivot point whereby lateral movement of the control member effects movement of the third and fourth pivot points in opposite directions and upward and downward movement of the control member effects movement of the third and fourth pivot points in a common upward or downward direction, and means connecting said links to said levers so that said levers are moved pivotally in opposite senses by said movement of the third and fourth pivot points in opposite directions, and are moved pivotally in common senses by common upward or downward movement of the third and fourth pivot points.

3. A seat according to claim 2 wherein said actuator includes a rod extending transversely of the back rest and said control member is supported on said rod, means pivoting said rod adjacent one end to the back rest frame to permit upward and downward movement of the control member, the rod carrying a screwthread in engagement with the control member such that rotation of the screwthread effects movement of the control member along the rod.

4. A seat according to claim 2 wherein said control member and screwthread are spring-mounted to damp shock applied thereto from said lumbar support member.

* * * * *